United States Patent [19]

Taylor

[11] Patent Number: 5,138,631
[45] Date of Patent: Aug. 11, 1992

[54] SATELLITE COMMUNICATION NETWORK

[75] Inventor: Desmond P. Taylor, Hamilton, Canada

[73] Assignee: GTE Spacenet Corporation, McLean, Va.

[21] Appl. No.: 454,344

[22] Filed: Dec. 21, 1989

[51] Int. Cl.$^5$ ............................................. H04L 27/30
[52] U.S. Cl. ........................................... 375/1; 370/18; 370/93; 455/12.1
[58] Field of Search ............... 370/18, 60, 93, 94.1, 370/94.2, 94.3, 104.1; 455/12, 13; 375/1; 380/34

[56] References Cited

U.S. PATENT DOCUMENTS

| | | | |
|---|---|---|---|
| 4,617,674 | 10/1986 | Mangulis et al. | 375/1 |
| 4,637,017 | 1/1987 | Assal et al. | 370/104.1 |
| 4,639,937 | 1/1987 | McRae et al. | 370/18 X |
| 4,688,216 | 8/1987 | Saburi | 370/104.1 |
| 4,742,512 | 5/1988 | Akashi et al. | 370/104.1 X |

OTHER PUBLICATIONS

Ziemer et al., *Digital Communications and Spread Spectrum Systems*, (MacMillan, 1985; Section 1-3.1, pp. 5-7).

Primary Examiner—Bernarr E. Gregory
Attorney, Agent, or Firm—J. Stephen Yeo

[57] ABSTRACT

A satellite communication system has a hub earth station and a plurality of terminal earth stations. Each inbound satellite communication link from a terminal earth station to the hub earth station carries digital data packets encoded in CDMA code for code division multiple access at a first bit rate during synchronized time slots on a contention channel. An outbound communication link from the hub earth station to the terminal earth stations sends time division multiplexed digital data at a second bit rate higher than the first bit rate. A number of systems may share the same hub, with each system using a different CDMA code.

2 Claims, 1 Drawing Sheet

SATELLITE COMMUNICATION NETWORK

BACKGROUND OF THE INVENTION

This invention pertains to satellite communication systems and more particularly is concerned with spread spectrum or code division multiple access satellite communication systems.

There are at present very small aperture terminal (VSAT) networks which employ code division multiple access (CDMA) techniques. These networks, however, do not permit distinct networks to share the same inbound space segment.

There is a need for private satellite networks containing between 20 and about 300 terminals in communication with a common hub ground station. Code division multiple access (CDMA) spread spectrum techniques were first used in military systems because of the cost of their implementation. Further, the possibility has been raised of systems with spread spectrum techniques in combination with time slotted packet contention techniques such as that known as ALOHA.

SUMMARY OF THE INVENTION

Briefly, there is provided a satellite communication system having a hub earth station and a plurality of terminal earth stations. Each inbound satellite communication link from a terminal earth station to the hub earth station carries digital data packets encoded in CDMA code for code division multiple access at a first bit rate during synchronized time slots on a contention channel. An outbound communication link from the hub earth station to the terminal earth stations sends time division multiplexed digital data at a second bit rate higher than the first bit rate. Another aspect of the invention forms a network with a number of systems sharing the same hub, each system using a different CDMA code.

DESCRIPTION OF THE PREFERRED EMBODIMENTS

In keeping with the invention, code division multiple access (CDMA) spread spectrum techniques are used in satellite communication systems and networks. The invention allows the sharing of an inbound space segment in a non-interfering manner by a number of terminal earth stations belonging to several distinct networks, while at the same time avoiding the necessity for shared hub facilities. Each network includes a corresponding hub ground station.

Figure 1:
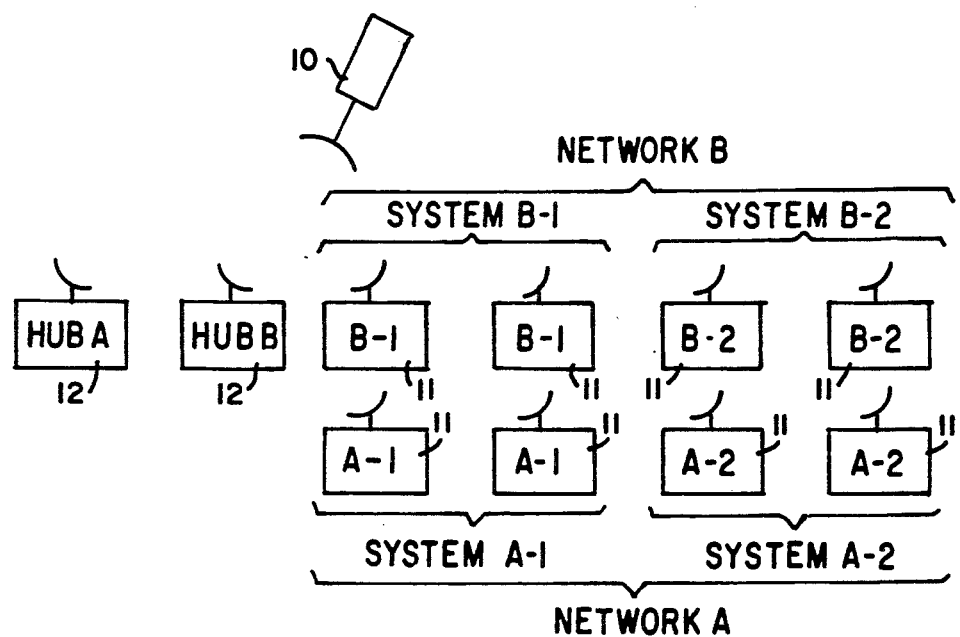
FIG. 1 is a diagram of a satellite system embodying the invention.
Figure 2:
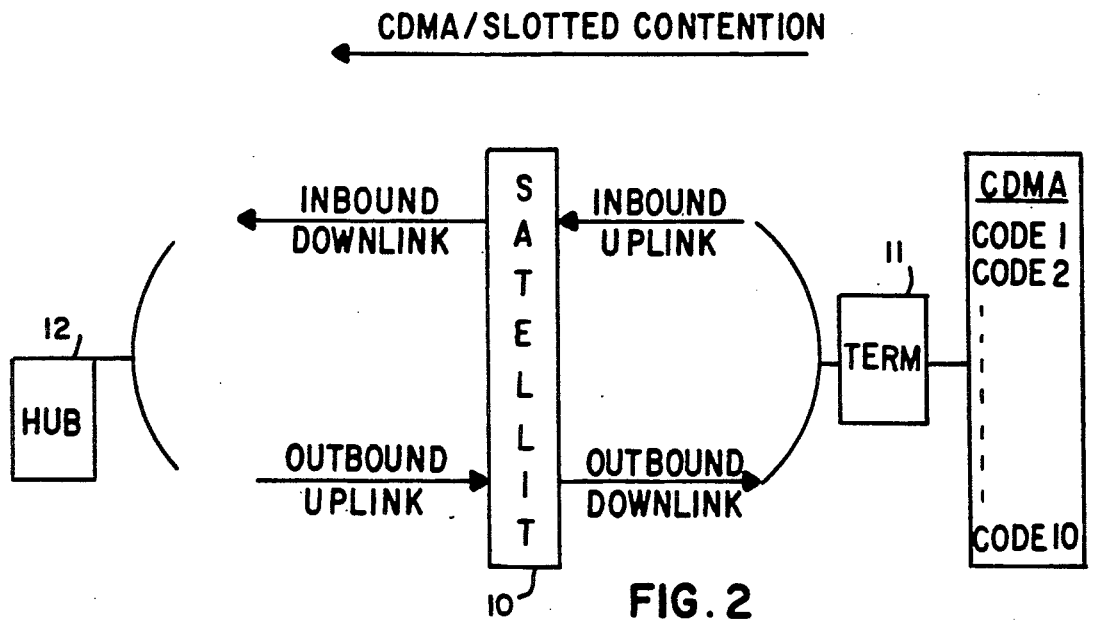
FIG. 2 illustrates the communication links between a hub and terminal of the system of FIG. 1.

Referring to FIG. 1, a space satellite 10 provides shared relay service for a plurality of distinct networks A, B. Each network includes a plurality of terminal ground stations 11 and a corresponding hub ground station 12. The terminal ground stations transmit packets to their respective hubs using the same inbound frequency bands. Each terminal ground station employs direct sequence spread spectrum transmission using a code in the form of pseudorandom binary sequence, e.g. a Gold Code, to spread the spectrum of a data-modulated binary phase shift keyed (BPSK) signal. This results in a transmitted signal of the form:

$$s(t) = Ac(t)d(t)\cos\omega t.$$

where $c(t)$ is a binary-valued waveform at rate $1/T_c$ representing the spread sequence and $d(t)$ is the binary-valued data waveform at rate $1/T$. In all cases, T is much greater than $T_c$. Also, the data waveform, $d(t)$, may include $r=\frac{1}{2}$, $K=7$ convolutional encoding. The ratio $T/T_c$ is known as the spreading factor or processing gain of the spread spectrum system.

A network, which is defined as a plurality of terminals coupled to a corresponding hub, may include several systems. All the terminals of a given system employ the same pseudorandom sequence code to spread their transmitted spectra. Different systems of a network use different codes, but share the same hub.

Each network has its own hub transmitting a time division multiplexed (TDM) outbound link at a bit rate higher than that of an inbound link. To meet FCC flux density limitations and to minimize the required antenna size at the terminals, some spectral spreading may be used in the outbound links from the hub. Despreading at the terminals may be accomplished using a corresponding baseband despreader.

In the inbound direction, from terminal to hub, each network utilizes a slotted multiaccess contention protocol, e.g. ALOHA. Slot synchronization is provided within each network; no attempt is made to synchronize slots among the different networks sharing the inlink. Collisions of packets within each individual system cause the destruction of all the colliding packets as the same spreading code is used. Each individual system can operate at a throughput of about 0.20 packets/slot, corresponding to an offered load of about 0.26 packets/slot. Because each individual system uses a different spreading code, collisions between the packets of different systems are not destructive but merely cause an increase in the effective ambient noise level. Thus as the number of systems sharing the inlink increases, performance degrades gracefully. For a spreading ratio of $T/T_c=127$, between 5 and 10 distinct spreading codes or signature sequences can simultaneously occupy the bandwidth with less than 1 dB of performance degradation, assuming that all the signatures are present all the time and that $r=\frac{1}{2}$, $k=7$ convolutional encoding is employed. Because of the low per-system traffic load, between 15 and 20 small to medium size networks are able to share the inbound bandwidth. This number may be increased by increasing the spreading ratio.

In a CDMA environment, one of the more difficult problems is that of acquiring code synchronization at the receiver so that despreading and demodulation can be successfully accomplished. This usually requires a combination of a matched filter and code tracking loop. In the present case because of the slotted environment, code synchronization is inherent within each network as the code starts on the slot boundary. Therefore, the receivers at the hubs may be simple active correlators followed by phase shift demodulators. However, if there is large tolerance in the slot boundaries, matched filters may be needed.

The use of coherent phase shift keying on the inlinks maximizes the performance of the convolutional code, and therefore, as noted earlier, maximizes the multiple access capability of the overall inlink. This has the added benefit of allowing the minimization of the transmit power from the terminals.

As indicated above, each individual network employs a slotted contention protocol on the inlink to its hub. Each system of a network employs a unique nominal signature or spreading sequence, so that all other systems that share the frequency band appear as noise. This is further aided by the fact that each network is self-synchronous, but is asynchronous to all others. The overlap of two or more signals from terminals in the same system, and therefore having the same spreading code, appears as a collision. All packets involved in the collision will be lost and will have to be retransmitted. This hard collision can occur only among the packets belonging to a particular system. Collisions between packets from different systems, and therefore having different spreading codes, will lead only to a small increase in the ambient noise level and therefore, to a minor increase in the rate at which packets are corrupted by bit errors.

Provided the penalty due to the CDMA is small (less than 1 dB), then the throughput of any of the N systems sharing the band may be expressed approximately as:

$$S = Ge^{-G} \text{ packets/slot}$$

where G is the offered load in packets per slot. This is the classical slotted ALOHA expression for throughput. On the other hand, if N systems, each with throughput S packets per slot and slot duration T, are occupying the band, then the overall channel utilization or throughput may be expressed as NS packets per slot-time. Because of the CDMA transmission format, this can be greater than one. If the per-system throughput is set at $S=0.20$ and $NS=5$, 25 systems may share the inlink bandwidth. Note that a system is a group of terminals that share a given spreading code as well as a shared hub. A given network may require more than one nominal spreading code, i.e., it may have too many terminals for one inbound channel. This may be accommodated by adding an additional receive chain at the hub for that network. However, each additional nominal spreading code is regarded as an additional system using the frequency band.

EXAMPLE

Suppose that terminals transmit at a data rate of 4,800 bits/sec and that $r=\frac{1}{2}$, $K=7$ convolutional encoding is employed. If each terminal transmission is spread by a factor of 127, each transmission is at a channel rate of 1,219,200 chips and a channel bandwidth of about 3 MHz will be required.

Further suppose that each terminal network consists of 100 terminals and that each such network operates at a throughput of $S=0.20$ packets/slot, corresponding to an offered load of $B=0.26$ packets/slot. If on average, there are 5 packets simultaneously in the channel from different networks, then the same channel can support approximately $N=5/0.2=25$ simultaneous networks with an overall performance penalty of about $\frac{1}{2}$ dB in received $E/N$. This allows a channel to support an overall population of around 2,500 terminals.

It will be appreciated that the invention provides a code division multiple access approach for allowing a large population of terminal terminals, organized into a moderately large group of small to medium-size networks, to occupy the same inbound space segment in an essentially non-interfering manner. Each network has its own hub and operates using a slotted contention protocol on the inlink and a TDM stream in a separate channel on its outlink.

Provision is made to have distinct private networks share the same inbound space segment or radio-frequency channel. This is done by assigning each system of a network a unique nominal signature or spreading code.

The invention is particularly suitable for small to medium-size terminal networks that each have a private hub rather than the shared hub that is usually required when more than one network shares inbound space segment.

What is claimed is:

1. A satellite communication system comprising:
a hub earth station means; and
a plurality of terminal earth station means, said terminal earth station means for providing an inbound satellite communication link from each of said terminal earth station means to said hub earth station means and for sending digital data packets encoded in CDMA code for code division multiple access at a first bit rate during synchronized time slots on a contention channel, and said hub earth station means for providing an outbound communication link to said terminal earth station means and for sending time division multiplexed digital data at second bit rate higher than said first bit rate.

2. A satellite communication network comprising:
a hub earth station means; and
a plurality of satellite communication systems; each system including said hub earth station means and a plurality of terminal earth station means, said terminal earth station means for providing an inbound satellite communication link from each of said terminal earth station means to said hub earth station means and for sending digital data packets encoded in CDMA code for code division multiple access at a first bit rate during synchronized time slots on a contention channel, and said hub earth station means for providing an outbound communication link to said terminal earth station means for sending time division multiplexed digital data at a second bit rate higher than said first bit rate, each system having a different CDMA code.

* * * * *